2,993,927
Patented July 25, 1961

2,993,927
1,1-BIS-(p-AMINOPHENYL)-2-ALKANOLS AND ESTERS THEREOF

John B. Wright, Kalamazoo Township, Kalamazoo County, Mich., assignor to The Upjohn Company, Kalamazoo, Mich., a corporation of Michigan
No Drawing. Filed Apr. 25, 1958, Ser. No. 730,812
12 Claims. (Cl. 260—477)

This invention relates to novel organic compounds, more particularly to 1,1-bis-(p-aminophenyl)-2-alkanols and esters thereof and acid addition salts of both.

The novel compounds of this invention are prepared by reacting a p-tert.-aminophenyl lithium with an alkyl α-hydrocarbonoxy-alkanoate to produce a 1,1-bis(p-aminophenyl)-2-hydrocarbonoxyalkanol which is then reacted with acid to produce a 1,1-bis(p-aminophenyl)-2-alkanone. Reduction of this compound with a carbonyl reducing agent is productive of a 1,1-bis(p-aminophenyl)-2-alkanol. Alternatively, the alkyl α-hydrocarbonoxy-alkanoate is substituted by an alkyl α-hydroxyalkanoate and the resulting 1,1-bis(p-aminophenyl)-1,2-alkanediol reduced to a 1,1-bis(p-aminophenyl)-2-alkanol. These compounds and reactions may be represented by the following formulae:

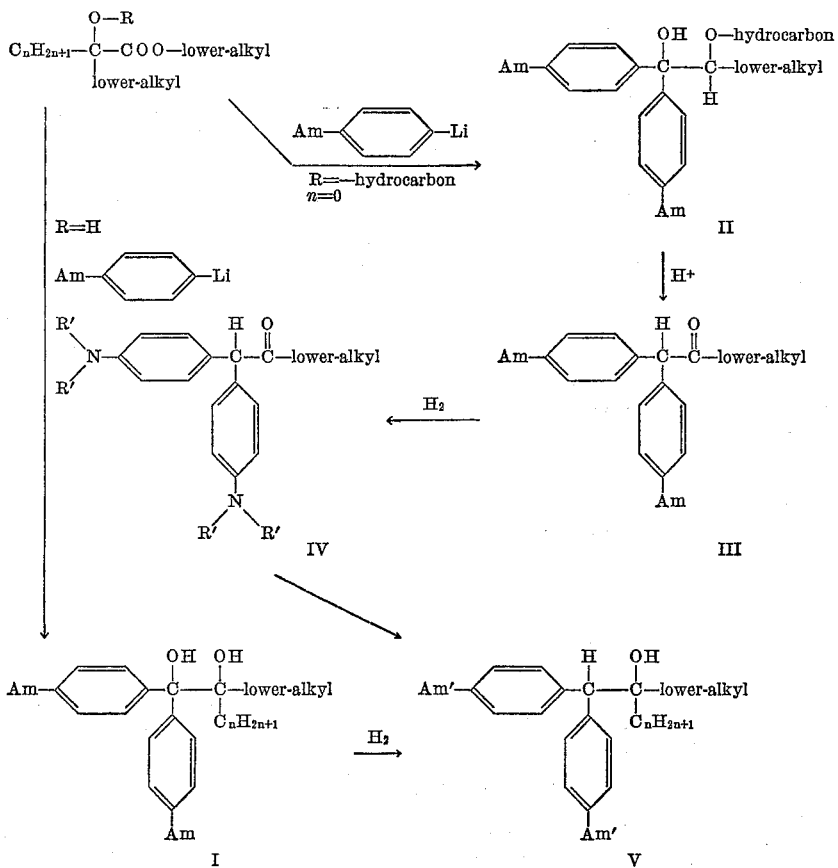

wherein R is hydrogen or hydrocarbon, R' is hydrogen or lower-alkyl, Am is tertiary di-lower-alkylamino, tertiary lower-alkylbenzylamino, tertiary dibenzylamino or an alkylene-amino group of the formula

R″N— wherein R″ is an alkylene radical containing from four to eight carbon atoms, inclusive, which with the amino nitrogen atom forms a ring containing from four to five carbon atoms, n is an interger from zero to eight, inclusive, Am' is primary amino, secondary lower-alkyl-amino or Am as defined above. Lower-alkyl in every instance means containing from one to eight carbon atoms, inclusive. Hydrocarbon is limited to those hydrocarbon radicals containing from one to eight carbon atoms, inclusive, e.g., phenyl, tolyl, xylyl, methyl, ethyl, allyl, octyl, preferably lower-alkyl. The compounds of this invention (V) are converted to their corresponding esters by reaction with an acylating agent so that the hydroxy group is replaced by an acyloxy group. Both of these compounds are converted to their acid addition salts by reaction with anhydrous or aqueous acid.

It is an object of this invention to provide 1,1-bis(p-aminophenyl)-2-alkanols (V), acyloxy esters thereof and acid addition salts of both. Another object is the provision of processes for the production thereof. Other objects will be apparent to those skilled in the art to which this invention pertains.

The 1,1-bis(p-aminophenyl-2-alkanols (V), acyloxy esters thereof and acid addition salts of both possess anti-convulsant activity. They are sleep-potentiators when given with hexobarbital, thereby increasing the effectiveness of the hexobarbital or reducing the amount of hexobarbital required to achieve a desired response. They possess progestational activity, and some produce adrenal hypertrophy and are useful in treatment of essential hypertension. They possess sedative activity.

The novel compounds of this invention comprise those wherein the amine is substituted with alkyl, dialkyl or is unsubstituted. The N-unsubstituted aminoalcohols are prepared from the corresponding N-unsubstituted amino alkanones (IV, R'=H) which in turn are prepared by hydrogenating the corresponding dibenzylaminoalkanones (III, Am=dibenzylamino). The monoalkylamino compounds of this invention are similarly prepared from the alkylbenzylamines (III, Am=alkylbenzylamino) by hydrogenation to produce the monoalkylamine (IV, R'=H, alkyl) which is reduced to the corresponding alkanol (V). Compounds possessing the structure V may also be prepared directly from III either by reduction of the carbonyl group (where $n=0$) or by reaction of III with suitable Grignard reagents or organo lithium derivatives (where $n=1-8$). Preferred are the di-lower-alkylamines, preferably dimethyl-amines. Also preferred are those compounds where $n$ is 0 and lower-alkyl is methyl or ethyl.

The 1,1-bis(p-aminophenyl)-2-alkanones (III) are prepared by treatment of a 1,1-bis(p-aminophenyl)-2-alkoxyalkanol, (II) with strong acid, e.g., oxalic, ten percent hydrochloric, preferably by heating, e.g., at up to 100 degrees centigrade. Several hours of heating are usually employed to ensure complete reaction.

Alternatively, the 1,1-bis(p-aminophenyl) - 2 - alkanols (V) of this invention are prepared by reducing a 1,1-bis(p-aminophenyl)-1,2-alkanediol (I), e.g., with hydrogen and palladium on charcoal catalyst. Other catalysts not poisoned by amines and other reducing agents, e.g., chemical, can be employed in the manner ordinarily used for the reduction of a benzohydryl alcohol.

The novel esters of this invention, i.e., 1,1-bis(p-aminophenyl)-2-alkanols 2-acylates are prepared by reacting a 1,1-bis(p-aminophenyl)-2-alkanol with an acid halide, e.g., a lower-aliphatic acid chloride or bromide, or acid anhydride, acid or ester under ester exchange conditions. 1,1-bis(p-aminophenyl) - 2 -alkanol 2-acylates thus prepared, preferably wherein the acyl radical of the acylate is that of a hydrocarbon carboxylic acid containing from one to eight carbon atoms, inclusive, are the pharmacologically acceptable acids which include the formate, acetate, propionate, butyrate, valerate, hexanoate, laurate, trimethylacetate, isobutyrate, isovalerate, tert.-butylacetate, $\beta$ - cyclopentylpropionate, cyclohexanecarboxylate, cyclohexylacetate, benzoate, phenylacetate, $\beta$-phenylpropionate, o-, m-, and p-toluate, acrylate, crotonate and undecylenate.

The acid addition salts of the compounds of this invention, e.g., the non-toxic acid addition salts, include the hydrochloride, hydrobromide, hydriodide, sulfate, phosphate, nitrate, acetate, formate, citrate, tartrate and lactate. Ordinarily, the di-acid addition salt is prepared by forming a salt of both amino groups. They are conveniently prepared by adding the acid in equivalent or excess amount to a solution of the base under anhydrous conditions. Alternatively, an aqueous solution of the salt can be prepared and the water removed in vacuo.

Compounds of the present invention thus prepared include 1,1-bis(p-aminophenyl)-2-propanol, 1,1-bis(p-aminophenyl)-2-methyl-2-propanol, 1,1-bis(p-aminophenyl)-2-methyl-2-butanol, 1,1-bis(p-aminophenyl)-2-octanol, 1,1-bis(p-methylaminophenyl)-2-propanol, 1,1-bis(p-methylaminophenyl)-2-methyl - 2 - propanol, 1,1-bis(p-methylaminophenyl)-2-methyl-2-butanol, 1,1 - bis(p-methylaminophenyl)-2-octanol, 1,1-bis(p-ethylaminophenyl)-2-propanol, 1,1-bis(p-ethylaminophenyl)-2-methyl-2-propanol, 1,1-bis(p-ethylaminophenyl)-2-methyl-2-butanol, 1,1-bis-(p-ethylaminophenyl)-2-octanol, 1,1 - bis(p-dimethylaminophenyl)-2-propanol, 1,1-bis(p - dimethylaminophenyl)-2-methyl-2-propanol, 1,1-bis(p-dimethylaminophenyl)-2-methyl-2-butanol, 1,1-bis(p-dimethylaminophenyl)-2-octanol, 1,1-bis(p-diethylaminophenyl)-2-propanol, 1,1-bis(p-diethylaminophenyl)-2-methyl - 2 - propanol, 1,1-bis(p-diethylaminophenyl)-2-methyl - 2 - butanol, 1,1-bis(p-diethylaminophenyl) - 2 - octanol, 1,1-bis(p-methylethylaminophenyl)-2-propanol, 1,1-bis(p-methylethylaminophenyl)-2-methyl-2-propanol, 1,1-bis(p-methylethylaminophenyl)-2-methyl-2-butanol, 1,1 - bis(p-methylethylaminophenyl)-2-octanol, 1,1-bis(p-pyrrolidinophenyl)-2-propanol, the dihydrochloride of each of the above compounds and the 2-acetate of each of the above compounds.

The following preparations and examples are illustrative of the process and products of the present invention, but are not to be construed as limiting.

PREPARATION 1

1,1-bis(p-dimethylaminophenyl)-2-ethoxypropanol

Into a flask fitted with a mechanical stirrer, dropping funnel, nitrogen inlet tube and an efficient condenser fitted with a calcium chloride drying tube was added 250 milliliters of dry ether and 5.55 grams (0.8 mole) of lithium ribbon. Over the course of about one hour there was then added eighty grams (0.4 mole) of freshly distilled colorless p-bromodimethylaniline dissolved in 200 milliliters of dry ether. Occasional heat was applied to maintain reflux. After addition was complete, reflux was continued for a total of about four hours until practically all of the lithium had reacted.

To the stirred solution of p-dimethylaminophenyl lithium was added a solution of 29.2 grams of ethyl $\alpha$-ethoxypropionate in 100 milliliters of dry ether over a period of about fifteen minutes so as to maintain a vigorous reflux. Upon addition of the ester a white solid precipitated immediately. The mixture was maintained overnight and then heated under reflux for two hours. To the stirred solution was then cautiously added 200 milliliters of a twenty percent ammonium chloride solution. The ether layer was separated and the aqueous layer extracted once with 100 milliliters of ether. The combined ethereal solutions upon standing a short time precipitated a solid which was removed by filtration and the filtrate evaporated to dryness in vacuo at room temperature. There was thus obtained 57.1 grams (88 percent) of 1,1-bis(p-dimethylaminophenyl)-2-ethoxypropanol melting at 109 to 115 degrees centigrade. Two crystallizations from Skellysolve C raised the melting point to 120.5 to 121 degrees.

*Analysis.*—Calculated for $C_{21}H_{30}N_2O_2$: C, 73.64; H, 8.83; N, 8.18. Found: C, 74.09; H, 8.76; N, 8.09.

PREPARATION 2

1,1-bis(p-dimethylaminophenyl)-2-ethoxybutanol

The procedure of Preparation 1 was followed on a one-half scale using ethyl $\alpha$-ethoxybutyrate. The recrystallization from Skellysolve C gave 21.5 grams (70 percent) of tan crystals of 1,1-bis(p-dimethylaminophenyl)-2-ethoxybutanol melting at 104 to 109 degrees centigrade. Recrystallization from Skellysolve C raised the melting point to 110.5 to 112 degrees.

*Analysis.*—Calculated for $C_{22}H_{32}N_2O_2$: C, 74.12; H, 9.05; N, 7.86. Found: C, 74.00; H, 8.96; N, 7.82.

PREPARATION 3

1,1-bis(p-dibenzylaminophenyl)-2-ethoxypropanol

A twelve liter flask fitted with stirrer, reflux condenser fitted with a drying tube and a dropping funnel was flushed with nitrogen. To the flask was added 240 grams (0.68 mole) of N-(p-bromophenyl)-dibenzylamine, 5,760 milliliters of anhydrous ether and 9.44 grams (1.36 moles) of lithium ribbon (or lithium emulsion). The mixture was stirred and heated at reflux for six hours.

To the reaction mixture containing p-dibenzylaminophenyl lithium was slowly added with stirring 49.7 grams (0.34 mole) of ethyl $\alpha$-ethoxypropionate in 150 milliliters of anhydrous ether and refluxing was continued for two hours. The addition product was decomposed with twenty percent aqueous ammonium chloride and the layers separated. The ether layer was washed with water, dried over anhydrous magnesium sulfate and evaporated to dryness in vacuo, leaving an oily residue of 1,1-bis(p-dibenzylaminophenyl)-2-ethoxypropanol.

PREPARATION 4

1,1-bis(p-methylbenzylaminophenyl)-2-ethoxypropanol

To a stirred mixture of 425 milliliters of sodium-dried ether and 9.44 grams (1.36 mole) of lithium ribbon was added 187.7 grams (0.68 mole) of p-bromo-N-methyl-N-benzylaniline in 340 milliliters of ether over a period of 45 minutes. The mixture was refluxed for one and one half hours and then 49.7 grams (0.34 mole) of ethyl α-ethoxypropionate in 170 milliliters of dry ether was added over a period of thirty minutes. A solid precipitated as the ester was added. The mixture was refluxed for two hours. To the stirred, cooled mixture was cautiously added 400 milliliters of a twenty percent aqueous ammonium chloride solution. The ether layer was separated and the aqueous layer extracted with ether. The combined ether layers were dried over magnesium sulfate and distilled to dryness in vacuo. There remained an oily residue of 183.2 grams of 1,1-bis(p-methylbenzylaminophenyl)-2-ethoxypropanol.

PREPARATION 5

1,1-bis(p-piperidinophenyl)-2-ethoxypropanol

To 2.78 grams (0.4 mole) of small pieces of lithium ribbon in 100 milliliters of anhydrous ether was added a slurry of 48.09 grams (0.25 mole) N-(p-bromophenyl) piperidine in 250 milliliters of anhydrous ether. The mixture was stirred and refluxed for two hours and to the resulting solution of p-piperidinophenyl lithium was added a solution of 14.6 gram (0.1 mole) of ethyl α-ethoxypropionate in fifty milliliters of anhydrous ether. The mixture was stirred and refluxed for four hours. To the cooled solution was added 100 milliliters of twenty percent ammonium chloride solution, causing a precipitate. After standing overnight, the mixture was filtered and the filtrate extracted with ether. There was obtained 27.4 grams of 1,1-bis(p-piperidinophenyl)-2-ethoxypropanol from the cake melting at 144 to 145 degrees centigrade and 3.6 grams from the ether. Recrystallization of the cake from ethanol raised the melting point to 150 to 153 degrees.

Analysis.—Calculated for $C_{27}H_{38}N_2O_2$: C, 76.73; H, 9.06; N, 6.63. Found: C, 76.83; H, 9.02; N, 6.78.

PREPARATION 6

1,1-bis(p-dimethylaminophenyl)-2-propanone

A solution of 13.68 grams (0.04 mole) of 1,1-bis(p-dimethylaminophenyl)-2-ethoxypropanol in a mixture of 30.6 milliliters of concentrated hydrochloric acid and seventy milliliters of water was refluxed for four hours. The solution was cooled, basified with a saturated sodium carbonate solution and then extracted with three 100-milliliter portions of ether. The extracts were dried and the ether distilled with the last traces removed in vacuo. The light yellow-green residue solidified upon standing and scratching to give 6.14 grams (98 percent) of 1,1-bis-(p-dimethylaminophenyl)-2-propanone melting at 61 to 64 degrees centigrade. Recrystallization from ethanol raised the melting point to 65 to 66 degrees.

Analysis.—Calculated for $C_{19}H_{24}N_2O$: C, 76.99; H, 8.16; N, 9.45. Found: C, 77.20; H, 8.23; N, 9.34.

PREPARATION 7

1,1-bis(p-dimethylaminophenyl)-2-butanone

Following the procedure described in Preparation 6, 16.5 grams (0.0463 mole) of 1,1 - bis(p - dimethylaminophenyl)-2-ethoxybutanol was converted with ten percent hydrochloric acid to 14.0 grams (97.5 percent) of 1,1-bis(p-dimethylaminophenyl)-2-butanone melting at 66.5 to 69.5 degrees centigrade. Repeated recrystallization from ethanol raised the melting point to 71.5 to 72.5 degrees.

Analysis.—Calculated for $C_{20}H_{26}N_2O$: C, 77.38; H, 8.44; N, 9.03. Found: C, 77.58; H, 8.09; N, 9.29.

PREPARATION 8

1,1-bis(p-dibenzylaminophenyl)-2-propanone

The residual oil described in Preparation 3 was refluxed overnight in a mixture of 595 milliliters of acetone and 260 milliliters of concentrated hydrochloric acid. The acetone was removed by distillation at reduced pressure leaving an aqueous suspension of 1,1-bis(p-dibenzylaminophenyl)-2-propanone dihydrochloride. The suspension was diluted with water, neutralized with sodium bicarbonate and extracted with two one-liter portions of chloroform which were separated, washed with water, dried and distilled at reduced pressure. The residue was triturated with ether to give 60.7 grams of 1,1-bis(p-dibenzylaminophenyl)-2-propanone melting at 165 to 182 degrees centigrade and 3.8 grams from the mother liquor. Repeated crystallization from benzene raised the melting point to 189 to 192.5 degrees.

Analysis.—Calculated for $C_{43}H_{40}N_2O$: C, 85.96; H, 6.71; N, 4.66. Found: C, 85.94; H, 6.75; N, 4.72.

PREPARATION 9

1,1-bis(p-methylbenzylaminophenyl)-2-propanone

A solution of 183.2 grams of 1,1-bis(p-methylbenzylaminophenyl)-2-ethoxypropanone in 595 milliliters of acetone and 260 milliliters of concentrated hydrochloric acid was refluxed for sixteen hours. The acetone was distilled and the residue diluted with one liter of water to give an aqueous solution of 1,1-bis(p-methylbenzylaminophenyl)-2-propanone dihydrochloride. The solution was basified with sodium bicarbonate and the oily green precipitate extracted with benzene which was washed with water and then distilled to dryness in vacuo. A small sample of the residual oil was crystallized from boiling Skellysolve C and used to seed the remaining oil. There was obtained 195.2 grams of 1,1-bis(p-methylbenzylaminophenyl)-2-propanone which, when crystallized from cyclohexane melted at 94 to 96 degrees centigrade. Further recrystallization raised the melting point to 105 to 107 degrees.

Analysis.—Calculated for $C_{31}H_{32}N_2O$: C, 83.00; H, 7.19; N, 6.25. Found: C, 83.15; H, 7.40; N, 6.46.

PREPARATION 10

1,1-bis(p-piperidinophenyl)-2-propanone and dihydrochloride

To 8.44 grams (0.02 mole) of 1,1-bis(p-piperidinophenyl)-2-ethoxypropanol was added 35 milliliters of water and 15.3 milliliters of concentrated hydrochloric acid. The solution was refluxed for four hours and then maintained at room temperature overnight. The solution was filtered through glass wool, basified with sodium bicarbonate and extracted with ether. The extract was dried and the ether distilled to give a blue oily residue of 5.9 grams of 1,1-bis(p-piperidinophenyl)-2-propanone which was redissolved in anhydrous ether and then an ethereal hydrogen chloride solution was added. The precipitate was filtered, dissolved in anhydrous ethanol and benzene added. The solvents were removed in vacuo and the residue triturated with ether until it solidified. There was obtained 6.1 grams of 1,1-bis(p-piperidinophenyl)-2-propanone dihydrochloride as a yellow tan solid that decomposed at about seventy degrees centigrade.

PREPARATION 11

1,1-bis(p-aminophenyl)-2-propanone

Five grams (8.33 millimols) of finely ground 1,1-bis(p-dibenzylaminophenyl)-2-propanone was suspended in 300 milliliters of alcohol and hydrogenated over 2.0 grams of a ten percent palladium on charcoal catalyst with an initial pressure of fifty p.s.i. The catalyst was removed by filtration and the solution concentrated at reduced pressure to give 2.1 grams of 1,1-bis(p-aminophenyl)-2-propanone melting at 130.5 to 134.5 degrees centigrade. One crystallization from alcohol raised the melting point to 136 to 138.5 degrees and two more crystallizations from isopropyl alcohol gave pale yellow platelets melting at 143.5 to 144 degrees centigrade.

Analysis.—Calculated for $C_{15}H_{16}N_2O$: C, 74.94; H, 6.71; N, 11.66. Found: C, 74.77; H, 7.06; N, 11.70.

PREPARATION 12

1,1-bis(p-methylaminophenyl)-2-propanone

Ten grams (0.022 mole) of 1,1-bis(p-methylbenzylaminophenyl)-2-propanone was hydrogenated over 4.0 grams of ten percent palladium on charcoal catalyst in 300 milliliters of 95 percent ethanol with an initial pressure of fifty p.s.i. After three hours, the catalyst was removed and washed with 95 percent ethanol. The filtrate and washings were combined and concentrated to dryness in vacuo.

PREPARATION 13

1,1-bis(p-dimethylaminophenyl)-2-methyl-1,2-propanediol

To a stirred mixture of 5.55 grams (0.8 mole) of lithium ribbon and 250 milliliters of ether was added eighty grams (0.4 mole) of p-bromo-N-dimethylaniline in 200 milliliters of dry ether over a period of thirty minutes. The mixture was refluxed for four and one half hours and to it was then added 13.2 grams of freshly distilled ethyl α-hydroxyisobutyrate in fifty milliliters of dry ether over a period of ten minutes. The mixture was refluxed for five hours and to the cooled stirred solution was added 200 milliliters of a twenty percent aqueous ammonium chloride solution. The ether layer was separated and the aqueous layer extracted with 200 milliliters of ether. The combined ether layers were dried over magnesium sulfate and the ether then evaporated to dryness, removing the last traces of ether in vacuo. Crystallization of the oily yellow solid from Skellysolve C gave 27.43 grams (84 percent) of cream-colored needles of 1,1-bis(p-dimethylaminophenyl)-2-methyl-1,2-propanediol melting at 121 to 123 degrees centigrade. Two more recrystallizations raised the melting point to 123 to 125.5 degrees.

*Analysis.*—Calculated for $C_{20}H_{28}N_2O_2$: C, 73.13; H, 8.59; N, 8.53. Found: C, 72.78; H, 8.43; N, 8.53.

PREPARATION 14

1,1-bis(p-methylbenzylaminophenyl)-2-methyl-1,2-propanediol

To a stirred mixture of 11.1 grams (1.6 moles) of lithium ribbon in 500 milliliters of anhydrous ether was added 221 grams (0.8 mole) of p-bromo-methylbenzylaniline dissolved in 400 milliliters of anhydrous ether over a period of forty minutes. The mixture was refluxed with stirring for four hours and to the mixture containing the p-methylbenzylaminophenyl lithium was added 26.4 grams (0.2 mole) of ethyl α-hydroxyisobutyrate in 100 milliliters of ether. The mixture was refluxed for four hours and then decomposed with 400 milliliters of twenty percent ammonium chloride solution. The ether layer was separated, dried and the ether distilled to give a dark yellow oil. The oil was washed with 95 percent ethyl alcohol which was decanted off and the remainder removed in vacuo to give 171.6 grams of 1,1-bis(p-methylbenzylaminophenyl)-2-methyl-1,2-propanediol.

EXAMPLE 1

1,1-bis(p-dimethylaminophenyl)-2-propanol and dihydrochloride

To a refluxing mixture of 1.14 grams (0.03 mole) of lithium aluminum hydride and 100 milliliters of anhydrous ether was added dropwise a solution of 8.89 grams (0.03 mole) of 1,1-bis(p-dimethylaminophenyl)-2-propanone in sixty milliliters of anhydrous ether. After addition was complete, the mixture was refluxed and stirred for 45 minutes and then decomposed by the successive addition of 1.33 milliliters of water, one milliliter of twenty percent aqueous sodium hydroxide solution and 4.7 milliliters of water. The mixture was filtered and the cake washed with ether. The combined ether solutions were dried over anhydrous sodium sulfate and the ether distilled, the last traces being removed in vacuo. The light amber oil solidified upon standing to give 8.8 grams (98 percent) of 1,1-bis(p-dimethylaminophenyl)-2-propanol melting at 80 to 81 degrees centigrade.

*Analysis.*—Calculated for $C_{19}H_{26}N_2O$: C, 76.47; H, 8.78; N, 9.39. Found: C, 76.60; H, 8.49; N, 9.53.

The dihydrochloride was prepared by the addition of an ethereal hydrogen chloride solution to a solution of the free base in ether. Recrystallization from anhydrous ethanol gave 1,1-bis(p-dimethylaminophenyl)-2-propanol dihydrochloride melting at 225 degrees centigrade (dec.).

*Analysis.*—Calculated for $C_{19}H_{26}N_2O \cdot 2HCl$: C, 61.45; H, 7.60; N, 7.55; Cl, 19.10. Found: C, 61.27; H, 7.62; N, 7.48; Cl, 19.49.

EXAMPLE 2

1,1-bis(p-dimethylaminophenyl)-2-butanol and dihydrochloride

Following the procedure described in Example 1, 1,1-bis(p-dimethylaminophenyl-2-butanone is reduced with lithium aluminum hydride to produce 1,1-bis(p-dimethylaminophenyl)-2-butanol which is converted to its dihydrochloride in the same manner as described in Example 1.

EXAMPLE 3

1,1-bis(p-aminophenyl)-2-propanol and dihydrochloride

Following the procedure of Example 1, 1,1-bis(p-aminophenyl)-2-propanone is reduced with lithium aluminum hydride to produce 1,1-bis(p-aminophenyl)-2-propanol which is converted with ethereal hydrogen chloride to 1,1-bis(p-aminophenyl)-2-propanol dihydrochloride.

EXAMPLE 4

1,1-bis(p-methylaminophenyl)-2-propanol and dihydrochloride

Following the procedure of Example 1, 1,1-bis(p-methylaminophenyl)-2-propanone is reduced with lithium aluminum hydride to produce 1,1-bis(p-methylaminophenyl)-2-propanol which is converted with ethereal hydrogen chloride to 1,1-bis(p-methylaminophenyl)-2-propanol dihydrochloride.

EXAMPLE 5

1,1-bis(p-piperidinophenyl)-2-propanol and dihydrochloride

Following the procedure of Example 1, 1,1-bis(p-piperidinophenyl)-2-propanone is reduced with lithium aluminum hydride to produce 1,1-bis(p-piperidinophenyl)-2-propanol which is converted with ethereal hydrogen chloride to 1,1-bis(p-piperidinophenyl)-2-propanol dihydrochloride.

EXAMPLE 6

1,1-bis(p-dimethylaminophenyl)-2-methyl-2-propanol

A solution of ten grams (0.03 mole) of 1,1-bis(p-dimethylaminophenyl)-2-methyl-1,2-propanediol in 115 milliliters of 95 percent ethanol and fifteen milliliters of acetic acid was hydrogenated over four grams of ten percent palladium on charcoal catalyst at an initial pressure of fifty p.s.i. The catalyst was removed by filtration and the filtrate concentrated to dryness in vacuo. The residue, the acetate salt of 1,1-bis(p-dimethylaminophenyl)-2-propanol, was diluted with 150 milliliters of water, basified with sodium bicarbonate and extracted with ether. The ether solutions were dried and concentrated to dryness leaving 6.24 grams of 1,1-bis(p-dimethylaminophenyl)-2-methyl-2-propanol as a yellow oil which crystalized with scratching. Recrystallization from 95 percent ethanol gave 2.58 grams melting at 94 to 97 degrees centigrade. A second recrystallization raised the melting point to 96.5 to 98 degrees.

*Analysis.*—Calculated for $C_{20}H_{28}N_2O$: C, 76.88; H, 9.03; N, 8.97. Found: C, 77.26; H, 8.78; N, 8.87.

EXAMPLE 7

*1,1-bis(p-methylaminophenyl)-2-methyl-2-propanol*

Following the procedure of Example 6, 1,1-bis(p-methylbenzylaminophenyl)-2-methyl-1,2-propanediol was hydrogenated with palladium on charcoal catalyst to give 1,1 - bis(p - methylaminophenyl) - 2 - methyl - 2 - propanol which, after recrystallization from a three to one mixture of Skellysolve C and benzene, melted at 107.5 to 108.5 degrees centigrade.

*Analysis.*—Calculated for $C_{18}H_{24}N_2O$: C, 76.02; H, 8.51; N, 9.85. Found: C, 75.90; H, 8.41; N, 9.74.

EXAMPLE 8

*1,1-bis(p-dimethylaminophenyl)-2-propanol 2-acetate*

A mixture of 8.94 grams of (0.03 mole) of 1,1-bis(p-dimethylaminophenyl)-2-propanol and 25 milliliters of acetic anhydride was heated on a steam bath for ninety minutes. The mixture was poured into ice and water and then basified with sodium carbonate. The precipitate was extracted with ether, the ether extracts dried and the ether removed by evaporation. The residual 1,1-bis(p-dimethylaminophenyl)-2-propanol 2-acetate melted at 102 to 105 degrees centigrade after two recrystallizations from Skellysolve C.

*Analysis.*—Calculated for $C_{21}H_{28}N_2O_2$: C, 74.08; H, 8.29; N, 8.23. Found: C, 74.15; H, 8.38; N, 8.34.

EXAMPLE 9

*1,1-bis(p-dimethylaminophenyl)-2-propanol 2-benzoate*

To a solution of 5.96 grams (0.02 mole) of 1,1-bis(p-dimethylaminophenyl)-2-propanol in 25 milliliters of dry benzene was added 2.81 grams (0.02 mole) of benzoyl chloride. The resulting solution was refluxed for 75 minutes and after cooling poured into ice and water. The mixture was basified with sodium carbonate and then extracted with ether. The extracts were dried and the solvent distilled. The gummy dark green solid residue was triturated with hot acetone, cooled and filtered. The filtrate was evaporated to dryness to give 1.08 grams of pale green 1,1-bis(p-dimethylaminophenyl)-2-propanol 2-benzoate melting at 148 to 150 degrees centigrade. Recrystallization from Skellysolve C gave colorless needles melting at 148 to 149 degrees.

*Analysis.*—Calculated for $C_{26}H_{30}N_2O_2$: C, 77.58; H, 7.51; N, 6.96. Found: C, 77.04; H, 7.48; N, 6.76.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of 1,1-bis-(p-aminophenyl)-2-alkanols and esters thereof represented by the formula:

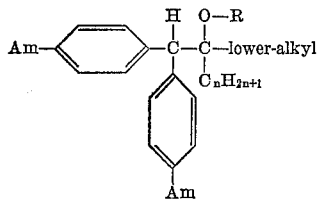

where R is selected from the group consisting of hydrogen and the acyl radical of a hydrocarbon carboxylic acid containing from one to eight carbon atoms, inclusive, $n$ is an integer from 0 to 8, inclusive, and Am is an amino group selected from the group consisting of primary amino, secondary lower-alkylamino, tertiary di-lower-alkylamino, and alkyleneamino of the formula $$R'\diagup N-$$

wherein R' is an alkylene group containing from four to eight carbon atoms, inclusive, which with the amino nitrogen atom forms a ring containing from four to five carbon atoms, and non-toxic di-acid addition salts thereof.

2. 1,1-bis(p-aminophenyl)-2-alkanols represented by the formula:

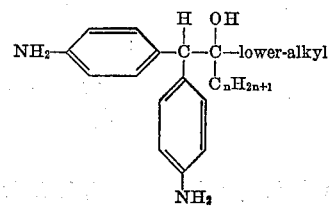

wherein $n$ is an integer from 0 to 8, inclusive.

3. 1,1-bis(p-aminophenyl)-2-alkanols represented by the formula:

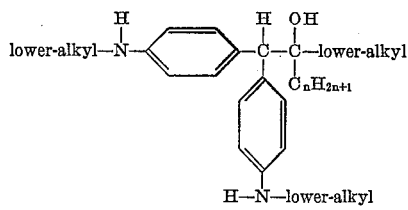

wherein $n$ is an integer from 0 to 8, inclusive.

4. 1,1 - bis(p - methylaminophenyl) - 2 - methyl - 2-propanol.

5. 1,1-bis(p-aminophenyl)-2-alkanols represented by the formula:

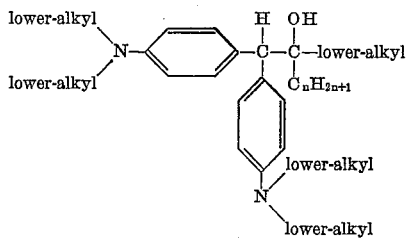

wherein $n$ is an integer from 0 to 8, inclusive.

6. 1,1 - bis(p - dimethylaminophenyl) - 2 - propanol.

7. 1,1 - bis(p - dimethylaminophenyl) - 2 - methyl - 2-propanol.

8. 1,1 - bis(p - aminophenyl) - 2 - propanol esters represented by the formula:

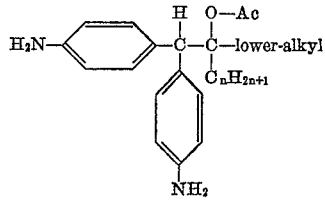

wherein $n$ is an integer from 0 to 8, inclusive, and Ac is the acyl radical of a hydrocarbon carboxylic acid containing from one to eight carbon atoms, inclusive.

9. 1,1 - bis(p - aminophenyl) - 2 - propanol esters represented by the formula:

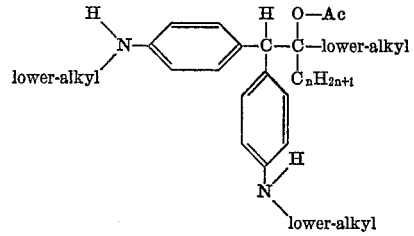

wherein $n$ is an integer from 0 to 8, inclusive, and Ac is the acyl radical of a hydrocarbon carboxylic acid containing from one to eight carbon atoms, inclusive.

10. 1,1 - bis(p - aminophenyl) - 2 - propanol esters represented by the formula:

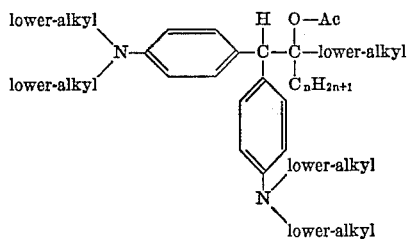

wherein $n$ is an integer from 0 to 8, inclusive, and Ac is the acyl radical of a hydrocarbon carboxylic acid containing from one to eight carbon atoms, inclusive.

11. 1,1 - bis(p - dimethylaminophenyl) - 2 - propanol 2-acetate.

12. 1,1 - bis(p - dimethylaminophenyl) - 2 - propanol 2-benzoate.

References Cited in the file of this patent

UNITED STATES PATENTS 1,942,820    Kranz _____ Jan. 9, 1934

OTHER REFERENCES

Chem. and Eng. News, Oct. 1, 1956, page 4780.

Lutz: Chem. Abstracts, vol. 50, col. 15, 485 (1956).